United States Patent
Glomot et al.

[11] Patent Number: 6,164,893
[45] Date of Patent: Dec. 26, 2000

[54] SELF-CONTAINED AND AUTOMATIC CHOCK FOR IMMOBILIZATION OF VEHICLES AND MODULAR IMMOBILIZATION DEVICE UTILIZING THESE CHOCKS

[75] Inventors: Gilles Glomot, Limoges; Etienne Penot, Chateauponsac, both of France

[73] Assignee: Glomot Penot Systeme, Limoges, France

[21] Appl. No.: 09/453,819

[22] Filed: Dec. 3, 1999

[51] Int. Cl.$^7$ .............................. B65G 69/00; B65G 67/02
[52] U.S. Cl. .............................................. 414/401; 188/32
[58] Field of Search .............................. 414/401; 188/32; 410/30

[56] References Cited

U.S. PATENT DOCUMENTS

| | | | |
|---|---|---|---|
| 2,895,569 | 7/1959 | Nystrom | 188/32 |
| 3,542,157 | 11/1970 | Noah | 188/32 |
| 3,655,014 | 4/1972 | Nyborg | 188/32 |
| 4,572,080 | 2/1986 | Williams et al. | 188/32 X |
| 5,302,063 | 4/1994 | Winsor | 188/32 X |

FOREIGN PATENT DOCUMENTS

| | | |
|---|---|---|
| 0384850 | 8/1990 | European Pat. Off. . |
| 960844 | 12/1999 | European Pat. Off. . |

*Primary Examiner*—Steven A. Bratlie
*Attorney, Agent, or Firm*—Young & Thompson

[57] ABSTRACT

A self-contained and automatic chock for immobilizing vehicles, particularly trucks in front of a loading dock, comprises a casing (18), a chock body (12) articulated (at 14) so as to pivot relative to this casing between a first retracted position and a second projecting position and a unit (16) for moving and locking the chock body between the first and second positions, arranged to coact with the casing.

6 Claims, 4 Drawing Sheets

SELF-CONTAINED AND AUTOMATIC CHOCK FOR IMMOBILIZATION OF VEHICLES AND MODULAR IMMOBILIZATION DEVICE UTILIZING THESE CHOCKS

FIELD OF THE INVENTION

The present invention relates to a self-contained and automatic chock for the immobilization of vehicles, particularly trucks in front of a loading dock as well as the modular immobilization device using such chocks.

BACKGROUND OF THE INVENTION

There is known from European patent No. 0 384 850, in the name of the same applicants, a particularly satisfactory immobilization device.

This device, in one of its modifications, comprises an assembly of chocks articulated in a fixed structure, a connected metal frame or a masonry casing for example, to ensure an integration at the site of use. These chocks each comprise a base, mounted pivotally relative to this fixed structure, a safety member, provided to coact with the safety member of the adjacent chock by assuring locking, and an actuator, in this case a pneumatic jack.

The operation of this device is as follows:

1/when the vehicle moves in reverse toward a loading dock for example, the chocks retract one after the other under the passage of the wheels, when in loading/unloading position, chock No. 1 immediately in front of the wheel is raised because the pneumatic jack is subjected to a residual pressure which ensures the permanent raising of the chock but which gives rise to a power substantially lower than the pressure of the wheel on the ground, and chock No. 2 is retracted beneath the wheel, when the wheel moves very slightly forward toward chock No. 1, a pedal actuated by the wheel, projecting from the surface of each chock and hence from this chock No. 1, ensures the displacement of a blocking lever which coacts with a lug carried by the adjacent chock No. 2, which is located below the wheel in the retracted position, such that the chock No. 1 is blocked in raised position while chock No. 2 is retracted by the wheel.

2/When the vehicle must be released, it is first of all necessary that the vehicle retreat slightly to free the actuator pedal and hence the lock, then the jacks are all actuated simultaneously to retract the assembly of the chocks which are then unlocked relative to each other.

It will be noted that this device is particularly attractive because the blocking is automatic and requires no manual or deliberate intervention. Moreover, self-blocking is ensured by a pair of chocks, the one beneath the wheel and the adjacent one, but if the vehicle were to escape by an uncontrolled movement of the first pair of chocks, it would be blocked by the following ones which would be self-blocking.

The fact remains, however, that the device requires a relatively precise in situ mounting such that the pedals, the actuating levers and the lugs will be correctly positioned relative to each other, so as to ensure reliable locking at the desired moment but also reliable unlocking at the time of freeing the vehicle.

Moreover, this locking of the chocks to each other is not necessarily practical for modularity of the installations.

The vehicles are also provided with wheels having all sorts of diameters, which makes it very difficult to dimension the chocks when they are connected to each other to ensure locking.

Such devices are undoubtedly interesting but there remains a barrier to be crossed, that of the investment which represents the equipment of the different loading ramps of industrial unit, so that it is necessary to reduce the cost of production on the one hand and to decrease the cost of installation on the other hand.

To decrease the cost of installation, it is necessary to decrease the number of constituent elements, it is necessary to use commercially available parts for the essentials and it is necessary to permit complete accessibility to each of the chocks independently.

If the device with a set of chocks according to the prior art gives satisfaction, there nevertheless exists the requirement for modular self-contained and automatic chocks and it is the object of the invention to provide such a modular chock, adapted to be associated with other adjacent chocks to form a modular immobilizing device, which operates in an entirely automatic and self-contained manner, which is easy to make, and hence less costly, which uses commercially available parts and whose installation is rendered very easy by the arrangement of the elements which comprise this self-contained chock and by the accessibility which it gives.

SUMMARY OF THE INVENTION

To this end, according to the invention, the self-contained and automatic chock for immobilizing vehicles, particularly trucks in front of a loading dock, comprises a casing, a chock body articulated pivotally relative to this casing between a first retracted position and a second projecting position and means to move and lock the chock body between the first and second positions, provided to coact with the casing.

More particularly, the moving and locking means comprise a locking flap swinging between two positions, one a locking position in abutment on a portion of the casing, and the other retracted, which correspond respectively to the projecting and retracted positions of the chock body, as well as a double-acting jack interposed between this flap and the casing.

According to one embodiment, the locking flap comprises a recess provided to receive two upper and lower transverse bars forming swinging axes and return means interposed between the chock body and a flap which maintain the flap in the retracted position in the absence of the action of pressure of the jack.

According to the arrangement of the preferred embodiment, the direction of pressure of the jack is exerted below the upper bar and the direction of return of the return means is exerted above the lower bar so as to obtain swinging effects of the locking flap.

So as to permit better accessibility, the body of the jack is secured to a plate articulated removably relative to the casing, this plate being accessible from outside the casing.

This plate comprises a plate secured to the body of the jack, two tongues forming a hook, provided to coact with an axle secured to the casing and the plate comprises a catch for gripping, accessible from outside the casing.

The invention also relates to the device using a series of these chocks.

BRIEF DESCRIPTION OF THE DRAWINGS

The invention will now be described with respect to a particular embodiment that is non-limiting, in relation to the accompanying drawings, in which the figures show.

DETAILED DESCRIPTION OF THE INVENTION

Figure 1:
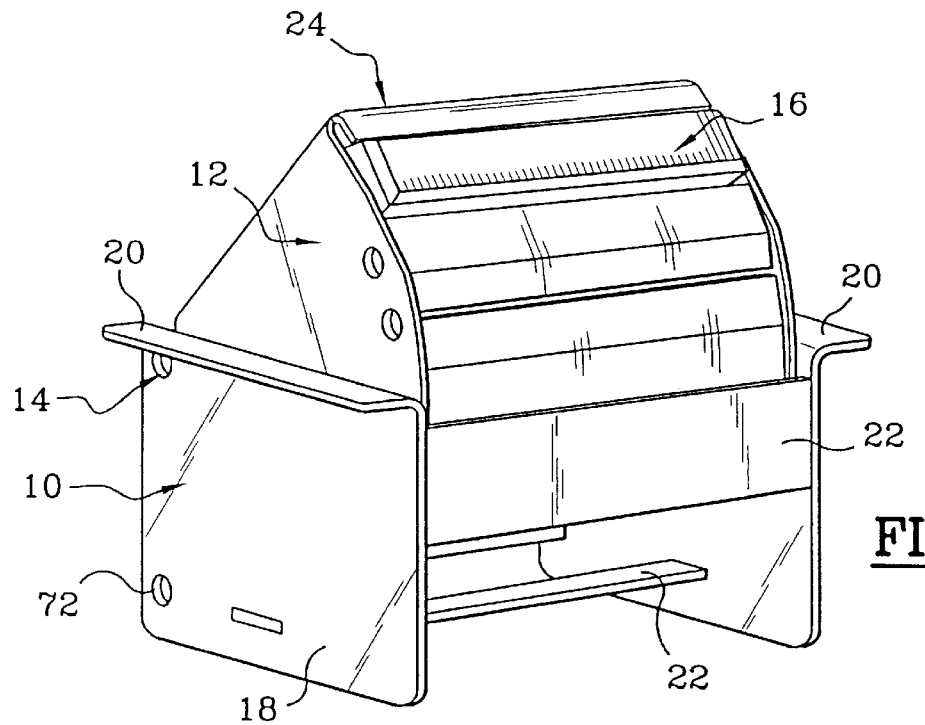
FIG. 1, a perspective of a self-contained and automatic chock according to the invention, with its frame, FIG. 2, a transverse cross-sectional view of the chock of FIG. 1, FIG. 3, a detailed perspective view of the locking flap, seen from the interior, FIG. 4, a detailed perspective view of the removable jack bracket, FIG. 5, a perspective view of the body of the chock, and FIGS. 6A to 6D, an operating sequence of a jack according to the invention.

In FIG. 1 there is shown a frame 10, a chock body 12 mounted pivotably about an axle 14 relative to the frame and moving and locking means 16.

The frame 10 comprises a casing 18 to be integrated into a pit during installation, the lateral ears 20 permitting securement and facilitating handling.

Cross-members 22 ensure the rigidity of the assembly and the absorption of forces.

Figure 2:
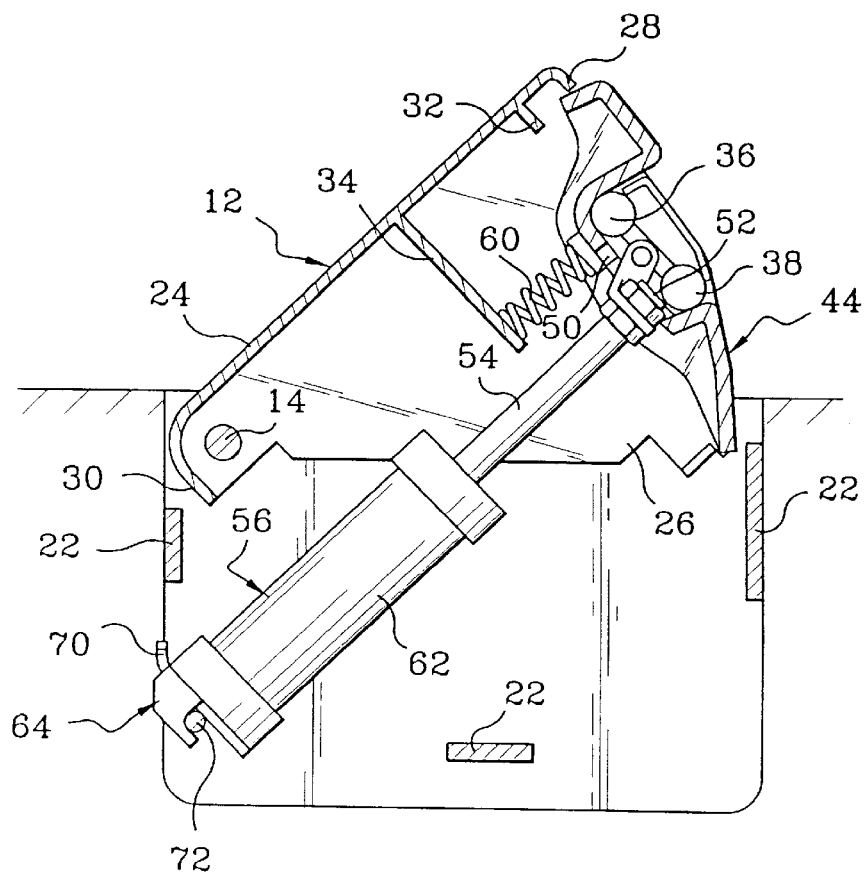
Figure 5:
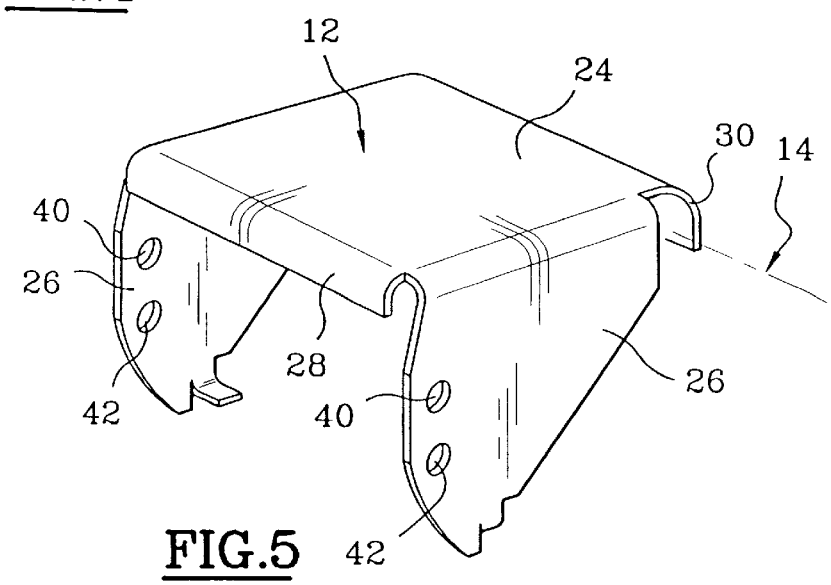

The chock body 12 is shown in detail in FIGS. 2 and 5.

The body comprises an upper plate 24 and two perpendicular wings 26, which permit the guiding of the pivotal movements relative to the casing, as will be explained later.

A front turn-down flange 28 is provided as well as a rear turn-down flange 30 below which is disposed the pivoting axle 14.

This plate 24 moreover comprises an abutment 32, projecting toward the interior of the casing, immediately behind the front turn-down flange 28. There are also provided two tongues 34, substantially parallel to the front turn-down flange 28, also projecting inwardly of the casing.

This plate 24 is completed by a fixed upper bar 36 and a fixed lower bar 38, connected between the lateral wings 26, in holes 40 and 42.

Figure 3:
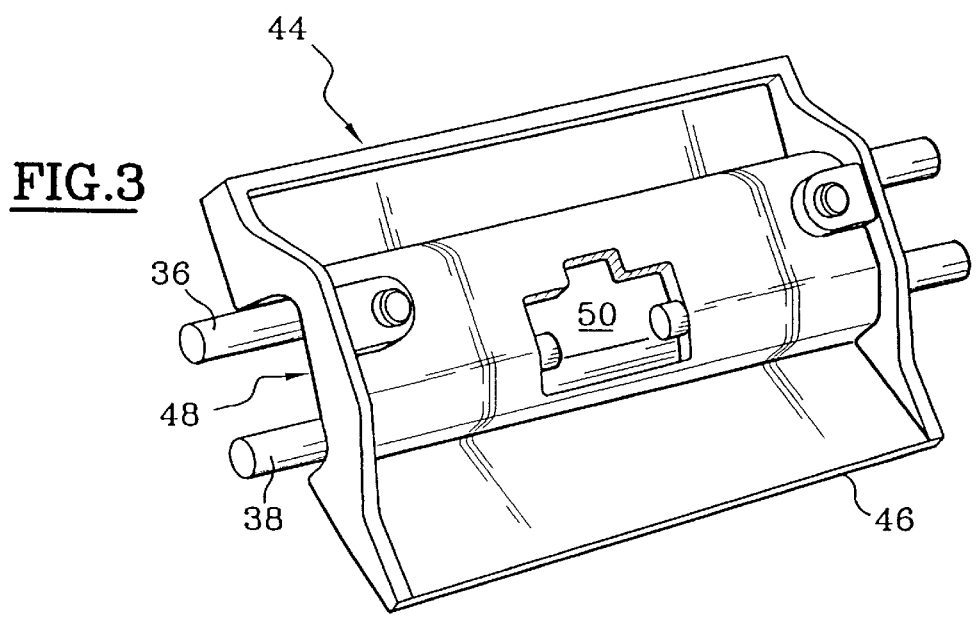

The handling and locking means 16 comprise a locking flap 44, shown in detail in FIG. 3, which comprises a lower bearing edge 46 as well as a transverse recess 48, provided to receive in its respective upper and lower portions, the upper bar 36 and the lower bar 38. A window 50 permits the passage of the head 52 of the rod 54 of a double-acting jack 56.

This jack has its direction of pressure substantially parallel to the plane of the plate 24 of the body of the chock when this chock body is in projecting position. This direction of pressure necessarily passes below the upper bar 36 to obtain swinging effects of the locking flap 44.

This flap also has two lugs for reception of one of the ends of the springs 60, shown in FIG. 2, which springs each bear with their other end on the tongues 34 of the plate 24, provided for this purpose.

It will be noted that the return direction of the springs is substantially parallel to the direction of pressure of the jack 56 and above the latter. Moreover, this direction is necessarily exerted above the lower bar 38.

Figure 4:
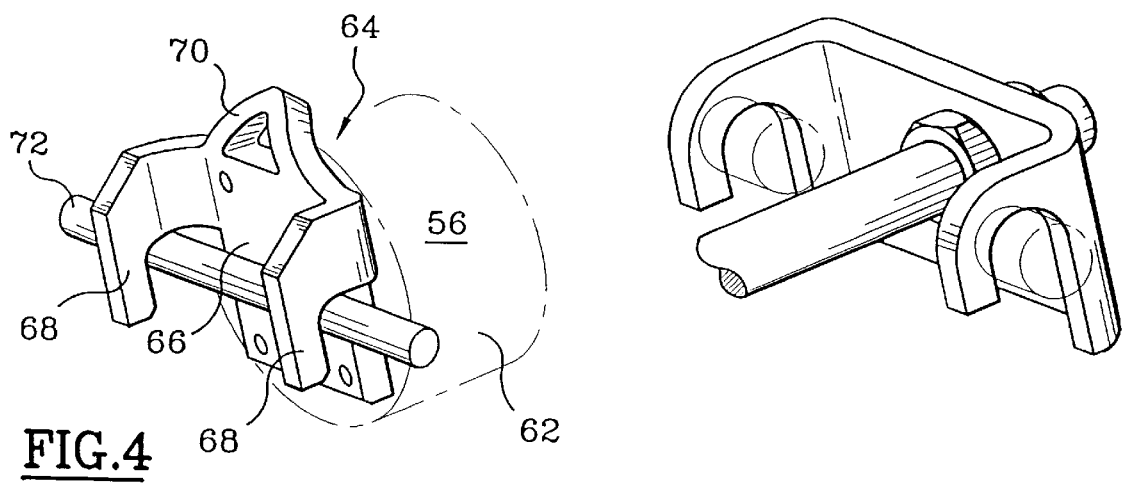

The body 62 of the jack 56 is secured to a support 64, shown by itself in FIG. 4.

This support 64 comprises a plate 66 screwed on the bottom of the jack body, two tongues 68 forming a hook, disposed on opposite sides of the plate and a gripping catch 70, slightly elbowed relative to the plane of the plate.

The two tongues 68 forming a hook are provided to hook over a transverse axle 72 secured to the casing 18.

The operation of the chock according to the invention will now be described, with respect to the sequence of FIGS. 6A to 6D. There is shown a single self-contained and automatic chock but in complete installations on a dock, there is often a device using a series of chocks, aligned one behind the other, as needed.

Figure 6A:
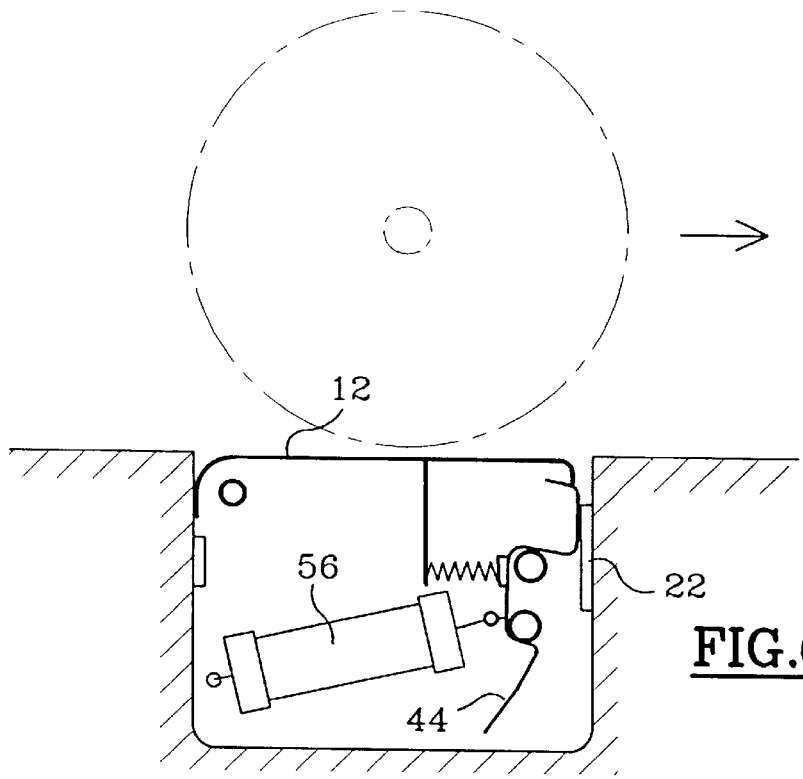

In FIG. 6A, the vehicle of which one wheel is symbolically shown, moves in the direction of the arrow. The piston of the jack is retracted so that the plate 24 is retracted and is located in the plane of the dock. This avoids the presence of projecting chocks on a loading dock for example, when there is no vehicle present.

In this case, the locking flap 44 is swung relative to the upper bar 36, the recess 48 of the flap being spaced from the lower bar 38.

Springs 60 act continuously and press the flap against the upper bar 36.

When the vehicle is in place (FIG. 6B), the jack 56 is pressurized. Given the orientation of the direction of its pressure, this action of the jack gives rise, by means of the locking flap and the upper and lower bars, to the pivoting and the projection of the plate 24 of the chock body 12.

Figure 6B:
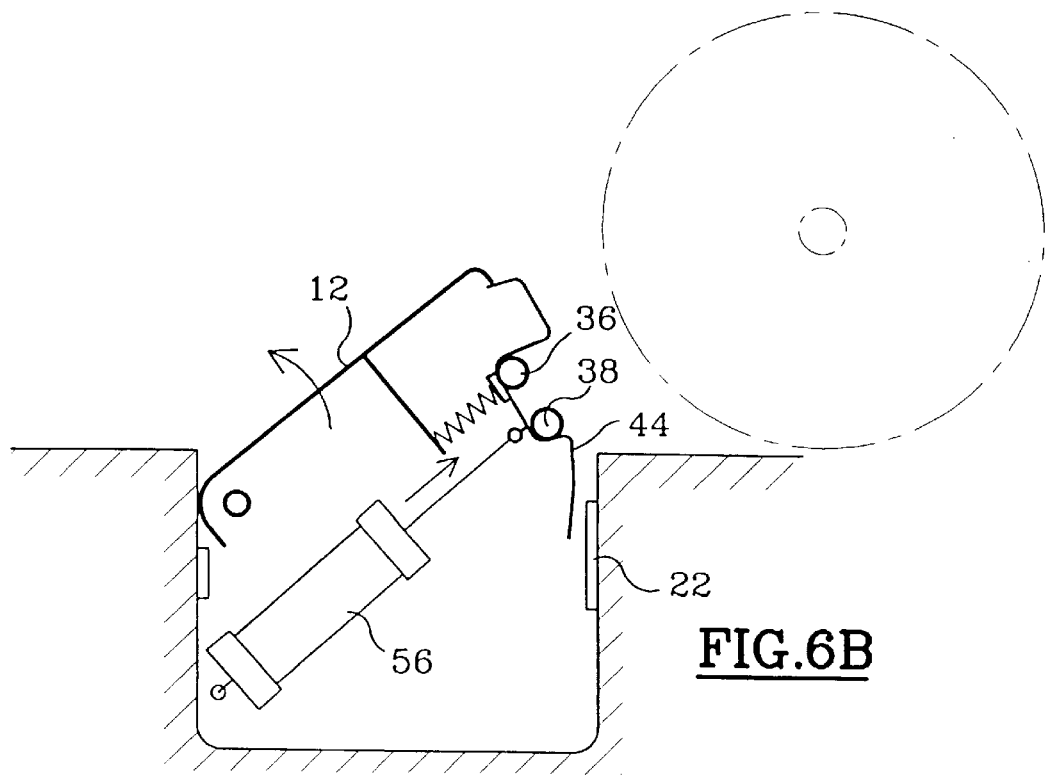

This projection takes place for all the chocks which are not below the wheels, and particularly for the one which is immediately in front of the wheel, as shown in this FIG. 6B.

The locking flap, by its recess 48, then bears on the two transverse bars 36 and 38, because the locking flap 44 is pressed by the piston of the jack against these two bars.

Figure 6C:
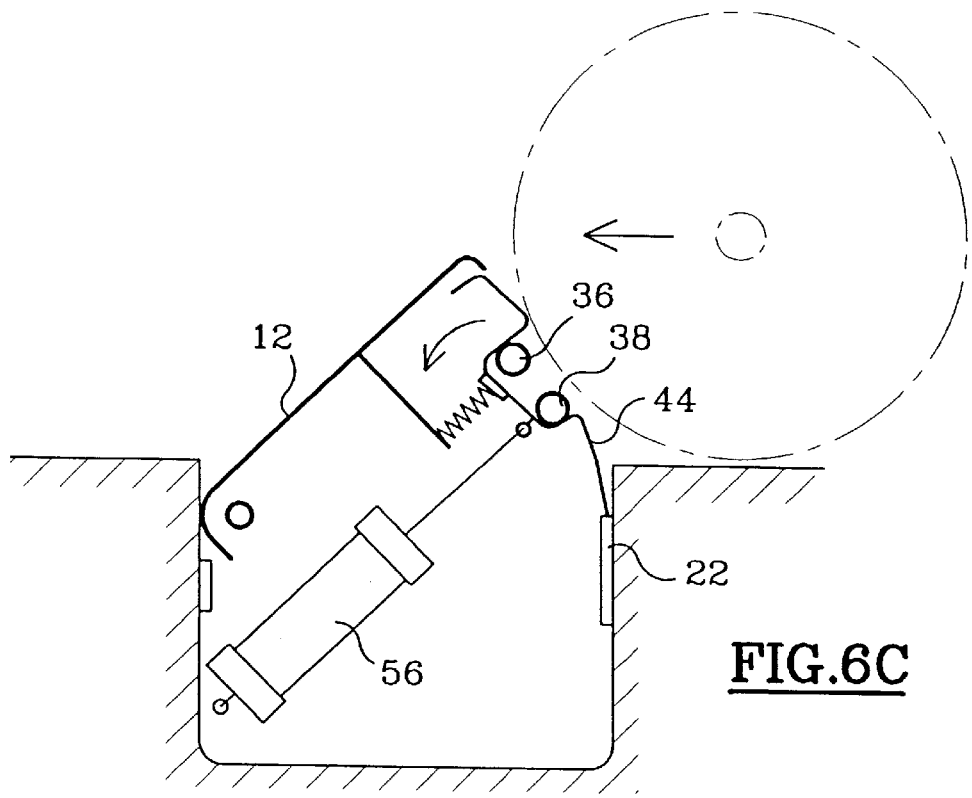
Figure 6D:
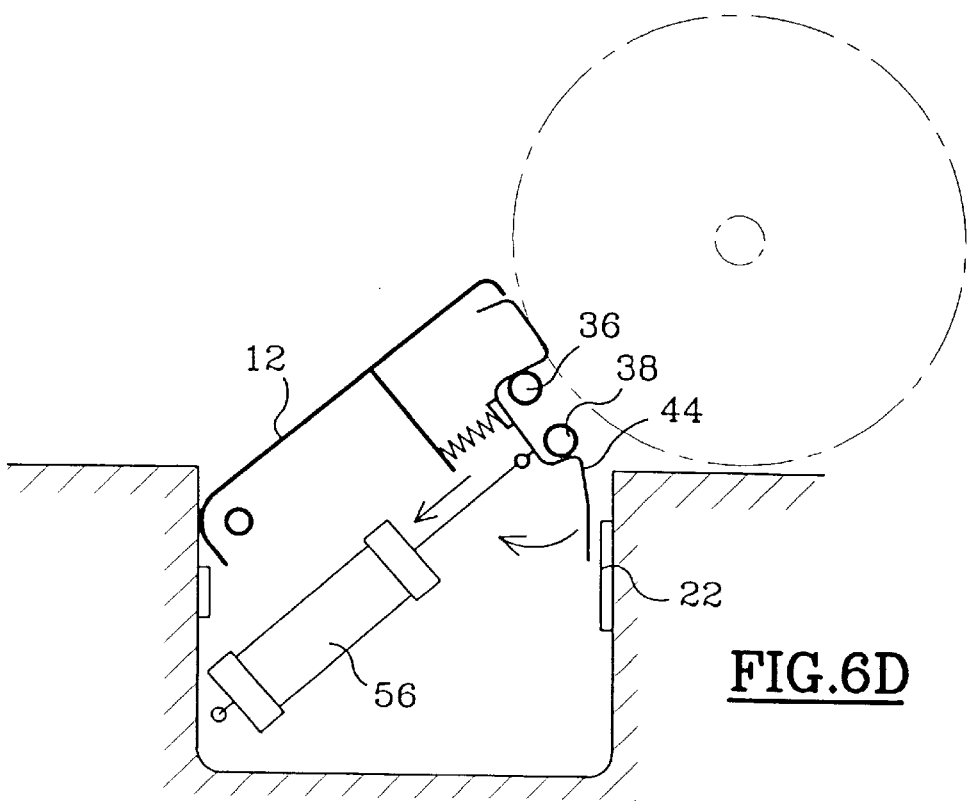

In FIG. 6C, the rod 54 of the double-acting jack is completely extended and its internal pressure is maintained. It will be seen that the locking flap 44 is swung relative to the lower bar 38 because the pressure of the jack, and hence the force which results from it, is greater than the stiffness of the springs 60.

This swinging brings the lower edge 46 of the locking flap into bearing on the cross-member 22 which serves as an abutment.

The plate 24 of the jack body 12 is then immobilized by pivoting about the axle 14. This holding in the extended position ensures the blocking of the wheel if the latter were to advance.

It will also be seen that the force exerted by the wheel on the body of the chock further reinforces the blocking force because the wheel bears on the upper portion of the locking flap, tending to swing it in the same direction as the jack, hence to position its lower edge on the abutment.

Thus in case of failure of jack pressure, safety is ensured because the flap is still maintained in blocking position.

When the vehicle must be freed (FIG. 6D), the jack rod 54 is retracted into the body of the jack, thanks to the double action thereof, which causes swinging of the lower edge of the flap inwardly of the casing and hence the release of the lower edge 46 from the abutment formed by the cross-member 22.

This is possible even when the wheel bears on the flap 44, because the flap is free relative to the two bars 36 and 38, which leaves a clearance in translation and moreover the surface bearing against the tire remains very small. Finally, the displacement is an arc of a circle with simply a point of tangency, so several bars of pressure suffice in any case.

It is to be noted that in any case, the chock body is moved in a controlled manner, even when it escapes the effect of the jack. Thus the fact of avoiding shocks gives to the material a longer life and permits a gain in the mechanical resistance necessary and hence a decrease of thicknesses.

The chock according to the invention also has very appreciable advantages as to its accessibility. Thus, as has been described, the movable elements are for the most part simply encased and not screwed or welded to each other.

To gain access to all the elements of the chock without withdrawing the latter from the pit, it suffices, after having released the pressure in the jack, to hook the gripping catch 70 of the support 64, by means of a rod from the outside, along the casing 18.

The support 64 is raised to disengage the tongues 68 from the axle 72, whereas the jack remains connected to the locking flap 44 by its head 52 but the body 56 is free.

The chock body 12 can then be raised as a cover, permitting access to all the internal elements in the casing.

It is possible to change the jack 56 in a very short time, as is also true for the locking flap or for a spring.

It will be noted that the number of elements is very low, which is an advantage of the chock according to the invention and that the wear members, the jack or the springs, are commercial items which can therefore be ordered and delivered very rapidly or even kept in stock given the low price due to mass production.

The emplacement of the chock according to the invention can be carried out by installing an aligned assembly of chocks to provide a device with a series of chocks. In this case, the precision of positioning is all relative, because each chock is self-contained. Moreover, in a series of chocks, if one of the chocks is out of order, this in no way prevents the operation of the other chocks, which is desirable for safety.

What is claimed is:

1. A self-contained and automatic chock for immobilizing vehicles in front of a loading dock, comprising:

a casing;

a chock body adapted to articulate pivotally relative to said casing between a first retracted position and a second projecting position;

a locking flap structured and arranged to swing between two positions, one for locking in abutment on a portion of the casing, and the other retracted, which correspond respectively to the projecting and retracted positions of the chock body; and a double-acting jack interposed between the flap and the casing;

the locking flap comprising a recess structured and arranged to receive an upper transverse bar and a lower transverse bar forming swinging axes; and return means interposed between the chock body and the flap for maintaining the flap in the retracted position in the absence of pressure from the jack.

2. The chock according to claim 1, wherein the direction of pressure of the jack is exerted below the upper bar, and the direction of return of the return means is exerted above the lower bar, so as to obtain swinging of the locking flap.

3. The chock according to claim 1, wherein the jack has a body which is secured to a support member removably articulated on the casing, said support member being accessible from outside the casing.

4. The chock according to claim 3, wherein the support member comprises a plate secured to the body of the jack, and two tongues forming a hook for coacting with an axle secured to the casing.

5. The chock according to claim 4, wherein the plate comprises a gripping catch accessible from outside the casing.

6. A modular device for immobilizing vehicles comprising a series of chocks, each chock comprising:

a casing;

a chock body adapted to articulate pivotally relative to said casing between a first retracted position and a second projecting position;

a locking flap structured and arranged to swing between two positions, one for locking in abutment on a portion of the casing, and the other retracted, which correspond respectively to the projecting and retracted positions of the chock body; and a double-acting jack interposed between the flap and the casing;

the locking flap comprising a recess structured and arranged to receive an upper transverse bar and a lower transverse bar forming swinging axes; and return means interposed between the chock body and the flap for maintaining the flap in the retracted position in the absence of pressure from the jack.

* * * * *